2,820,048

PROCESS FOR DEHYDROCHLORINATING POLY-CHLOROCYCLOHEXYLCHLOROSILANES

Arthur N. Pines, Snyder, and George H. Wagner, Clarence, N. Y., assignors to Union Carbide Corporation, a corporation of New York No Drawing. Application January 21, 1955
Serial No. 483,434

15 Claims. (Cl. 260—448.2)

This invention relates to a process for dehydrochlorinating polychlorocyclohexylchlorosilanes and to the new compositions of matter obtained thereby. More particularly, the invention relates to a process for dehydrochlorinating dichlorocyclohexyltrichlorosilanes whereby only cyclohexadienyltrichlorosilane or both cyclohexadienyltrichlorosilane and monochlorocyclohexenyltrichlorosilanes may be prepared in high production rates, in pure form and in desirable yields.

Heretofore numerous methods have been proposed for dehydrochlorinating the chlorinated derivatives of hydrocarbon substituted chlorosilanes. For the most part such methods have been directed toward the dehydrochlorination of monochloro- and dichloroethylchlorosilanes to yield their corresponding vinyl and chlorovinylchlorosilanes. The removal of hydrogen chloride from chloroethylchlorosilanes is ordinarily accomplished by reacting the latter compounds with bases, for example the tertiary amines, such as quinoline or picoline, in an amount chemically equivalent to or in excess of, the hydrogen chloride to be removed. Such reactions may be illustrated by the following chemical equation representing the dehydrochlorination of alpha, beta dichloroethyltrichlorosilane:

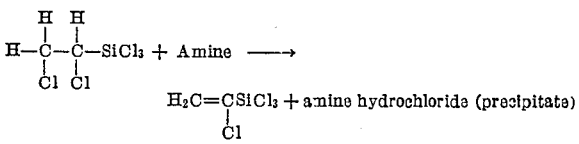

The known processes of this type relating to the removal of hydrogen chloride from chloroethylchlorosilanes, such as dichloroethylchlorosilane, to form unsaturated chlorosilanes are attended with certain serious disadvantages. For example, the use of excess or even theoretical quantities of the required bases is almost prohibitive in cost from the commercial standpoint. Moreover, the products of such reactions have been impure and the yields low due to the high production of by-products and resinous materials. In addition, it has been found that the use of excess or even theoretical quantities of the required bases creates difficulties in handling the separation of the desired unsaturated product from the amine hydrochloride by-product. This is particularly true in operations wherein large quantities of chloroalkylchlorosilanes are dehydrochlorinated. In view of the considerable difficulties encountered in the dehydrochlorination of the lower chloroalkylchlorosilanes, which are of relatively simple molecular structure, such processes have not been employed to dehydrochlorinate the chlorinated derivatives of the higher alkylchlorosilanes or employed to dehydrochlorinate other chlorinated derivatives of chlorosilanes such as polychlorinated cyclic hydrocarbon-substituted chlorosilanes, which are of a more complex molecular structure.

The present invention provides a method whereby polychlorocyclohexylchlorosilanes, especially 3,4-dichlorocyclohexyltrichlorosilane may be readily dehydrochlorinated to produce only 2,4-cyclohexadienyltrichlorosilane or both 2,4-cyclohexadienyltrichlorosilane and either or both 4-chloro-2-cyclohexenyltrichlorosilane and 3-chloro-4-cyclohexenyltrichlorosilane, which are new compounds, in a pure state and at desirable production rates. The process of the instant invention is particularly advantageous as the considerable formation of by-products and resinous materials, which characterize the prior art dehydrochlorinations of other chlorosilanes, is avoided.

In accordance with the instant invention 3,4-dichlorocyclohexyltrichlorosilane is dehydrochlorinated to the desired compound or compounds by heating said trichlorosilane in the presence of small amounts of a catalyst to evolve hydrogen chloride and removing the evolved hydrogen chloride from the reaction zone. More particularly, dehydrochlorination is accomplished by heating the mixture of trichlorosilane and catalyst to its boiling temperature to evolve hydrogen chloride and removing the evolved hydrogen chloride from the reaction zone. The temperature at which the reaction is conducted will vary according to the reaction pressure. Desirably reduced pressures are employed to permit boiling of the reaction mixtures at temperatures lower than those obtainable if the reaction were conducted at atmospheric pressure. Temperatures of from about 125° C. to about 250° C. may be employed in the practice of our invention; however we prefer to employ temperatures of from about 150° C. to about 235° C.

As catalysts for the dehydrochlorination of 3,4-dichlorocyclohexyltrichlorosilane we may employ aluminum chloride, isoquinoline and isoquinoline hydrochloride. When aluminum chloride is employed as the catalyst it is desirable that it be added in an amount of from about 0.1 percent to about 3 percent by weight of the compound being dehydrochlorinated. On the other hand when isoquinoline or isoquinoline hydrochloride is employed as the dehydrochlorinating catalyst it may be added in an amount of from about 5 percent to about 30 percent by weight of the compound being dehydrochlorinated.

In the practice of our invention we have found that when aluminum chloride is employed as the catalyst to dehydrochlorinate 3,4 - dichlorocyclohexyltrichlorosilane we obtain only 2,4-cyclohexadienyltrichlorosilane as the product of our reaction. Minor amounts of by-products are prepared, however, such amounts are not appreciable. The reaction wherein aluminum chloride is employed as a catalyst may be depicted as follows:

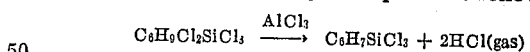

On the other hand, the use of isoquinoline or isoquinoline hydrochloride as the catalyst to dehydrochlorinate 3,4-dichlorocyclohexyltrichlorosilane makes possible the production of both 2,4-cyclohexadienyltrichlorosilane and a monochlorocyclohexenyltrichlorosilane. Such reactions may be depicted as follows:

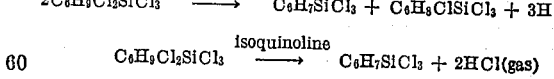

Without wishing to be bound by any one particular theory, one possible explanation for the differences in the above reactions is the difference in the catalysis mechanisms. That is, isoquinoline, as well as isoquinoline hydrochloride acts as a proton acceptor whereas aluminum chloride acts as a chlorine acceptor. In the instance where isoquinoline or isoquinoline hydrochloride is employed as the dehydrochlorinating catalyst, should the reaction be conducted for a sufficient period of time there will probably be produced only the 2,4-cyclohexadienyltrichlorosilane.

In carrying out the process of the invention according to one method thereof; 3,4-dichlorocyclohexyltrichlorosilane and isoquinoline are charged to a flask connected to a distilling column and the mixture heated to its boiling temperature. Hydrogen chloride gas evolved from the reaction mixture passes through the column and is vented at the head of the column where it may be recovered. Heating of the mixture is continued until evolution of hydrogen chloride ceases. After heating there remains in the flask, a mixture comprising predominately cyclohexadienyltrichlorosilane together with significant amounts of the monochlorocyclohexenyltrichlorosilanes and small amounts of the catalyst and side reaction products. Both cyclohexadienyltrichlorosilane and the monochlorocyclohexenyltrichlorosilanes may then be readily separated from this mixture by fractional distillation. The use of this method in the dehydrochlorination reaction is limited to only those instances where isoquinoline or isoquinoline hydrochloride is employed as the catalyst. Aluminum chloride is not employed in the practice of this method as it has been found that such compound also catalyzes the polymerization of the unsaturated products.

A preferred method for carrying out the process of the invention includes charging 3,4-dichlorocyclohexyltrichlorosilane and a catalyst to a flask connected to a packed distilling column, provided with a still head and receiver, and heating the mixture to its boiling temperature under reflux and removing the product or products of the reaction. This method can be employed with all of the dehydrochlorinating catalysts enumerated above and has particular advantage that the process may be conducted in a single operation. A further advantage in the instance where aluminum chloride is employed as the catalyst is that contact with the unsaturated cyclohexadienyltrichlorosilane product is kept at a minimum.

In the practice of the preferred embodiment of the invention, hydrogen chloride commences to evolve from the reaction mixture when such mixture has been heated to its boiling temperature. The hydrogen chloride passes through the packed column and is vented to a hood. During reflux, gaseous cyclohexadienyltrichlorosilane passing to the still head is condensed and passed to a receiver. If desired only a portion of the condensed product is passed to the receiver and the remaining portion returned as liquid reflux.

When isoquinoline or isoquinoline hydrochloride is employed as the catalyst the gaseous products passing to the still head include both cyclohexadienyltrichlorosilane and monochlorocyclohexenyltrichlorosilane and consequently both may be condensed and passed to the receiver. However, if desired suitable equipment may be employed to permit the separate recovery of each of the products, or to permit the recovery of only the cyclohexadienyltrichlorosilane and provide for the return of the monochlorocyclohexenyltrichlorosilanes to the reaction flask in order that it may be further dehydrochlorinated.

One embodiment of the invention includes the dehydrochlorination of trichlorocyclohexyltrichlorosilane to prepare phenyltrichlorosilane. Such may be readily accomplished by employing any of the procedures disclosed above.

The starting materials employed in the present invention are known and may be prepared by chlorinating cyclohexenyltrichlorosilane, which in turn can be prepared as the addition product of vinyltrichlorosilane to 1,3-butadiene. For example, 3,4-dichlorocyclohexyltrichlorosilane may be prepared by chlorinating cyclohexenyltrichlorosilane while dissolved in silicon tetrachloride, at a temperature of from about 45 to about 50° C. In the preparation of this compound we have employed a cyclohexenyltrichlorosilane to silicon tetrachloride solvent weight ratio of about 1.7. The products of the reaction were separated by distillation with the 3,4-dichlorocyclohexyltrichlorosilane obtained at a boiling temperature of 82° C. under a pressure of 0.15 mm. Hg absolute and 3,4,6-trichlorocyclohexyltrichlorosilane obtained at a boiling temperature of 95° C. under a pressure of 0.3 mm. Hg absolute.

The following examples are illustrative of the invention.

*Example 1*

To a 500 cc. round-bottomed kettle connected to a 10-plate column, which was equipped with a set of receivers, were charged 306 grams of 3,4-dichlorocyclohexyltrichlorosilane and 32 grams of isoquinoline. The apparatus was designed to operate at reduced pressure and a soda-lime trap was used to protect the vacuum pump from hydrogen chloride formed during the reaction. Heat was applied and at a pressure of 550 mm. Hg absolute and at a temperature of 235° C. the evolution of hydrogen chloride was noted since at that point it was observed that the soda-lime trap commenced to become warmer. Shortly thereafter refluxing of the reaction mixture commenced and a total of 173 grams of low boiling product was distilled to the receivers. A distillation of the product under reduced pressure resulted in our obtaining 85 grams of a product boiling at 70° C. under a pressure of 4.5 mm. Hg absolute and 31.6 grams of a second product boiling at 75° C. under a pressure of 0.4 mm. Hg absolute. The first product namely the one boiling at 70° C. under a pressure of 4.5 mm. Hg absolute was found to have a density of 1.27 grams per cc. at 25° C. and was also found to agree quite closely in carbon, hydrogen, silicon, and chlorine content with the corresponding calculated values for 2,4-cyclohexadienyltrichlorosilane. In addition, the bromine adsorption value for the compound as calculated in terms of grams bromine per gram of sample also agreed quite closely with the theoretical value for 2,4-cyclohexadienyltrichlorosilane.

The second product namely the one boiling at 75° C. under a pressure of 0.4 mm. Hg absolute was also analyzed and found to contain 11.3 percent by weight of silicon and 56.2 percent by weight of chlorine which values agreed quite closely with the theoretical content for silicon (11.2 percent) and chlorine (56.8 percent) of a monochlorocyclohexenyltrichlorosilane which probably includes both 4-chloro-2-cyclohexenyltrichlorosilane and 3-chloro - 4 - cyclohexenyltrichlorosilane. Moreover, the bromine adsorption value obtained for this product agreed quite closely with the calculated value for a monochlorocyclohexenyltrichlorosilane.

*Example 2*

To a 250 cc. round-bottomed flask connected to a 10-plate column, which was equipped with a set of receivers, were charged 103 grams of 3,4-dichlorocyclohexyltrichlorosilane and 38 grams of isoquinoline. The apparatus was designed to operate at reduced pressure and a soda-lime trap was employed to protect the vacuum pump from the hydrogen chloride formed during reaction. The kettle was first heated at low pressure (40 mm. Hg absolute) and the pressure slowly increased until the evolution of hydrogen chloride was noted by the warming of the soda-lime trap. Shortly thereafter refluxing of the reaction mixture commenced and a total of 37 grams of the product was distilled to one of the receivers. A distillation of the product resulted in our obtaining 27 grams of a material boiling at 37° C. under a pressure of 1.2 mm. Hg absolute. This product had a density of 1.27 grams per cc. at 25° C. This distillate was analyzed for element content and the following results were obtained and compared with their corresponding calculated values for 2,4-cyclohexadienyltrichlorosilane.

| Component | Product analysis (weight percent) | Cyclohexadienyltrichlorosilane theory (weight percent) |
|---|---|---|
| C | 33.7 | 33.7 |
| H | 4.0 | 3.3 |
| Si | 12.8 | 13.1 |
| Cl | 50.1 | 49.9 |
| Bromine adsorption (g. Br/g. sample) | (0.69) | (0.75) |

*Example 3*

Following the procedure disclosed in Example 2, 106 grams of 3,4-dichlorocyclohexyltrichlorosilane and 0.2 gram of aluminum chloride were charged to the kettle and the mixture heated at a kettle temperature of 157° C. under a pressure 30 mm. Hg absolute. In several hours 57 grams of volatiles boiling between 120 and 130° C. at 30 mm. Hg absolute were collected in the receiver. About 15 grams of solid and cross-linked residue remained in the kettle. Distillation of the 57 gram product resulted in our obtaining 11.1 grams having a product boiling between 53 and 55° C. under a pressure of 2.9 mm. Hg absolute. This product had a density of 1.29 grams per cc. at 25° C. The product was also analyzed for carbon, hydrogen, silicon, chlorine content and such values compared with the theoretical calculated values for 2,4-cyclohexadienyltrichlorosilane. The table below contains a tabulated account of the above analyses, and as may be seen therefrom the experimental values agreed quite closely with the theoretical values for 2,4-cyclohexadienyltrichlorosilane.

| Component | Product analysis (weight percent) | Cyclohexadienyltrichlorosilane theory (weight percent) |
|---|---|---|
| C | 34.3 | 33.7 |
| H | 3.3 | 3.3 |
| Si | 12.6 | 13.1 |
| Cl | 49.1 | 49.9 |
| Bromine adsorption (g. Br/g. sample) | (0.55) | (0.75) g. Br |

*Example 4*

Employing the procedure disclosed in Example 2, 142 grams of 3,4,6-trichlorocyclohexyltrichlorosilane and 1 gram of aluminum chloride were first gently heated under a reduced pressure at a temperature of about 50° C. Hydrogen chloride was evolved as indicated by a warming of the soda-lime trap. Shortly thereafter refluxing commenced and the reaction was conducted at a temperature of from 75 to 140° C. under a pressure of 10 mm. Hg absolute. The product (49 grams) was collected in the receivers at a head temperature of 65° C. under a pressure of 10 mm. Hg absolute. During a relatively short reaction period the evolution of hydrogen chloride was so rapid that it was difficult to maintain the desired pressure. At the end of the reaction the kettle temperature rose to 280° C. and a kettle residue of 40 grams remained. Analysis of the 49 gram product resulted in the finding that we had prepared substantially pure phenyltrichlorosilane.

The new compounds of the present invention namely 2,4-cyclohexadienyltrichlorosilane and the monochlorocyclohexenyltrichlorosilanes find application both as starting materials in the synthesis of other monomeric chlorosilanes as well as in the synthesis of polysiloxanes. The unsaturated bonds of the compounds will permit the addition of desirable groups to the hydrocarbon ring. Moreover, since the chlorine atoms bonded to the silicon atom of the compound are hydrolyzable both the cyclohexadienyl- and the monochlorocyclohexenyltrichlorosilanes may be hydrolyzed either alone or in admixture with other hydrolyzable silanes to form polymeric siloxanes containing unsaturation in the pendent hydrocarbon groups. A specific example of a copolymer which may be prepared by employing one of the new compounds of this invention includes the product prepared by cohydrolyzing a mixture comprising predominately diethyldichlorosilane together with small amounts of either cyclohexadienyltrichlorosilane or a monochlorohexenyltrichlorosilane in an ice bath. The copolymeric materials obtained thereby will contain a random dispersal of cyclohexadienyl- or monochlorocyclohexenylsiloxane units in the diethylsiloxane polymer. As is known such polysiloxanes may be later cross-linked through their unsaturated groups to form thermosetting resins which have been found particularly useful as coating materials.

What is claimed is:

1. A process for dehydrochlorinating a polychlorocyclohexylchlorosilane to an unsaturated derivative thereof which comprises heating a polychlorocyclohexylchlorosilane in the presence of catalytic amounts of a compound taken from the group consisting of aluminum chloride, isoquinoline and isoquinoline hydrochloride to its boiling temperature to evolve hydrogen chloride and recovering an unsaturated derivative of said polychlorocyclohexylchlorosilane.

2. A process for dehydrochlorinating a polychlorocyclohexyltrichlorosilane to an unsaturated derivative thereof which comprises heating a polychlorocyclohexyltrichlorosilane in the presence of catalytic amounts of a compound taken from the group consisting of aluminum chloride, isoquinoline, and isoquinoline hydrochloride to its boiling temperature to evolve hydrogen chloride and recovering an unsaturated derivative of said polychlorocyclohexyltrichlorosilane.

3. A process for dehydrochlorinating 3,4-dichlorocyclohexyltrichlorosilane to 2,4-cyclohexadienyltrichlorosilane which comprises heating said 3,4-dichlorocyclohexyltrichlorosilane in the presence of catalytic amounts of aluminum chloride to its boiling temperature to evolve hydrogen chloride and recovering 2,4-cyclohexadienyltrichlorosilane.

4. A process for dehydrochlorinating 3,4-dichlorocyclohexyltrichlorosilane to an unsaturated derivative thereof which comprises heating said 3,4-dichlorocyclohexyltrichlorosilane in the presence of catalytic amounts of isoquinoline to its boiling temperature to evolve hydrogen chloride and recovering an unsaturated derivative of 3,4-dichlorocyclohexyltrichlorosilane.

5. A process for dehydrochlorinating 3,4-dichlorocyclohexyltrichlorosilane to 2,4-cyclohexadienyltrichlorosilane thereof which comprises heating said 3,4-dichlorocyclohexyltrichlorosilane in the presence of catalytic amounts of isoquinoline to its boiling temperature to evolve hydrogen chloride and recovering 2,4-cyclohexadienyltrichlorosilane.

6. A process for dehydrochlorinating 3,4-dichlorocyclohexyltrichlorosilane to a monochlorocyclohexeneyltrichlorosilane which comprises heating said 3,4-dichlorocyclohexyltrichlorosilane in the presence of catalytic amounts of isoquinoline to its boiling temperature to evolve hydrogen chloride and recovering a monochlorocyclohexenyltrichlorosilane.

7. A process for dehydrochlorinating 3,4-dichlorocyclohexyltrichlorosilane to an unsaturated derivative thereof which comprises heating said 3,4-dichlorocyclohexyltrichlorosilane in the presence of catalytic amounts of a compound taken from the group consisting of aluminum chloride, isoquinoline and isoquinoline hydrochloride, to its boiling temperature to evolve hydrogen chloride and recovering an unsaturated derivative of said 3,4-dichlorocyclohexyltrichlorosilane.

8. A process for dehydrochlorinating 3,4-dichlorocyclohexyltrichlorosilane to prepare an unsaturated derivative thereof which comprises heating said 3,4-dichlorocyclohexyltrichlorosilane in the presence of catalytic amounts of a compound taken from the group consisting of aluminum chloride, isoquinoline and isoquinoline hydrochloride, to a temperature of from about 125° C. to about 250° C., under reflux, to evolve hydrogen chloride and recovering an unsaturated derivative of said 3,4-dichlorocyclohexyltrichlorosilane.

9. A process for dehydrochlorinating 3,4-dichlorocyclohexyltrichlorosilane to 2,4-cyclohexadienyltrichlorosilane which comprises heating said 3,4-dichlorocyclohexyltrichlorosilane in the presence of from about 0.1 percent to about 3 percent by weight of said 3,4-dichlorocyclohexyltrichlorosilane of aluminum chloride, to a temperature of from about 125° C. to about 250° C., under reflux, to evolve hydrogen chloride and recovering 2,4-cyclohexadienyltrichlorosilane.

10. A process for dehydrochlorinating 3,4-dichlorocyclohexyltrichlorosilane to 2,4-cyclohexadienyltrichlorosilane thereof which comprises heating said 3,4-dichlorocyclohexyltrichlorosilane in the presence of from about 5 percent to about 30 percent by weight of said 3,4-dichlorocyclohexyltrichlorosilane, of isoquinoline, to a temperature of from about 125° C. to about 250° C., under reflux, to evolve hydrogen chloride and recovering 2,4-cyclohexadienyltrichlorosilane.

11. A process for dehydrochlorinating 3,4-dichlorocyclohexyltrichlorosilane to a monochlorocyclohexenyltrichlorosilane which comprises heating said 3,4-dichlorocyclohexyltrichlorosilane in the presence of from about 5 percent to about 30 percent by weight of said 3,4-dichlorocyclohexyltrichlorosilane of isoquinoline, to a temperature of from about 125° C. to about 250° C., under reflux, to evolve hydrogen chloride and recovering a monochlorocyclohexenyltrichlorosilane.

12. Unsaturated derivatives of polychlorocyclohexyltrichlorosilane taken from the group consisting of 2,4-cyclohexadienyltrichlorosilane, 3-chloro-4-cyclohexenyltrichlorosilane and 4-chloro-2-cyclohexenyltrichlorosilane.

13. 2,4-cyclohexadienyltrichlorosilane.

14. 3-chloro-4-cyclohexenyltrichlorosilane.

15. 4-chloro-2-cyclohexenyltrichlorosilane.

References Cited in the file of this patent
UNITED STATES PATENTS

| 2,512,390 | Sommer | June 20, 1950 |
| 2,574,390 | Hatcher | Nov. 6, 1951 |